(12) United States Patent
Mohapatra et al.

(10) Patent No.: US 11,403,131 B2
(45) Date of Patent: Aug. 2, 2022

(54) DATA ANALYSIS FOR PREDICTIVE SCALING OF CONTAINER(S) BASED ON PRIOR USER TRANSACTION(S)

(71) Applicant: INTERNATIONAL BUSINESS MACHINES CORPORATION, Armonk, NY (US)

(72) Inventors: Biswajit Mohapatra, Pune (IN); Prasanta Kumar Pal, Balasore (IN); Venkata Vinay Kumar Parisa, Secunderabad (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 302 days.

(21) Appl. No.: 16/782,434

(22) Filed: Feb. 5, 2020

(65) Prior Publication Data

US 2021/0240517 A1    Aug. 5, 2021

(51) Int. Cl.
| | |
|---|---|
| *G06F 9/46* | (2006.01) |
| *G06F 9/50* | (2006.01) |
| *G06F 9/455* | (2018.01) |
| *G06N 20/00* | (2019.01) |

(Continued)

(52) U.S. Cl.
CPC .............. *G06F 9/466* (2013.01); *G06F 9/445* (2013.01); *G06F 9/5027* (2013.01); *G06N 20/00* (2019.01); *G06F 9/5005* (2013.01); *G06F 9/505* (2013.01); *G06F 2009/4557* (2013.01);

(Continued)

(58) Field of Classification Search
None
See application file for complete search history.

(56) References Cited

U.S. PATENT DOCUMENTS

| | | | |
|---|---|---|---|
| 9,031,896 B2 * | 5/2015 | Mathews | G06N 7/005 706/52 |
| 9,888,067 B1 * | 2/2018 | Yemini | H04L 67/1008 |
| RE48,714 E  * | 8/2021 | Crouchman | G06F 9/5011 |

(Continued)

OTHER PUBLICATIONS

Mel et al., "The NIST Definition of Cloud Computing," National Institute of Standards and Technology, Information Technology Laboratory, Special Publication 800-145, Sep. 2011 (pp. 1-7).

(Continued)

*Primary Examiner* — Abu Zar Ghaffari
(74) *Attorney, Agent, or Firm* — Michael A. Petrocelli, Esq.; Kevin P. Radigan, Esq.; Heslin Rothenberg Farley & Mesiti P.C.

(57) ABSTRACT

Predictive scaling of containers is provided based on obtaining, by one or more processors, prior transaction data on one or more of a user's prior transactions on one or more transaction-centric applications, and analyzing by the processor(s), the prior transaction data to predict whether a current transaction of the user on an application is deterministic or non-deterministic as to one or more functional layers of multiple functional layers of the application. Based on predicting that the current transaction is deterministic as to the functional layer(s) of the application, the processor(s) determines compute resource requirements for the deterministic transaction, and launches one or more containers in advance to run the functional layer(s) based, at least in part, on the computed resource requirements of the deterministic transaction.

16 Claims, 12 Drawing Sheets

(51) Int. Cl.
*G06F 9/445* (2018.01)
*G06N 3/08* (2006.01)

(52) U.S. Cl.
CPC .............. *G06F 2009/45575* (2013.01); *G06F 2209/5014* (2013.01); *G06F 2209/5019* (2013.01); *G06N 3/08* (2013.01)

(56) References Cited

U.S. PATENT DOCUMENTS

| | | |
|---|---|---|
| 2006/0167950 A1* | 7/2006 | Vertes ................. G06F 11/3664 |
| 2010/0185847 A1* | 7/2010 | Shasha ................... G06F 21/54 |
| | | 713/150 |
| 2018/0109610 A1 | 4/2018 | Einkauf et al. |
| 2018/0219956 A1 | 8/2018 | Wang et al. |
| 2018/0262443 A1* | 9/2018 | Zhang ................... G06F 9/5038 |
| 2019/0018877 A1 | 1/2019 | Dickey |
| 2019/0188774 A1 | 6/2019 | Lehr et al. |
| 2020/0118137 A1* | 4/2020 | Sood ................... G06F 3/04817 |
| 2020/0167145 A1* | 5/2020 | Franchitti ............... H04L 67/34 |
| 2020/0167512 A1* | 5/2020 | Chitra .................... G06Q 50/06 |
| 2021/0064512 A1* | 3/2021 | Sirov .................. G06F 11/3636 |
| 2021/0263779 A1* | 8/2021 | Haghighat ............ G06F 9/5061 |

OTHER PUBLICATIONS

Taherizadeh et al., "Dynamic Multi-Level Auto-Scaling Rules for Containerized Applications", Computer and Communications Networks and Systems, The Computer Journal, vol. 62, No. 2 (Feb. 2019) (24 pages).

* cited by examiner

DATA ANALYSIS FOR PREDICTIVE SCALING OF CONTAINER(S) BASED ON PRIOR USER TRANSACTION(S)

BACKGROUND

Cloud computing refers to a group of network elements providing services on demand, such as data storage and computing power, without directed active management by a user. Cloud computing relies on a sharing of resources to achieve coherence and economies of scale.

Cloud computing can be provided as a service over the Internet, such as in the form of "Infrastructure as a Service" (IaaS), "Platform as a Service" (PaaS), and/or "Software as a Service" (SaaS). SaaS can deploy software licensing as an application to customers for use as a service on demand. Further, SaaS vendors can host the application on their own cloud or, for instance, on a public cloud.

The provision of such services allows a user access to as much in the way of computing resources as needed, without purchasing and/or maintaining the infrastructure, such as hardware or software, that would be required to provide the service otherwise. For instance, a user can instead obtain access via a subscription, purchase, and/or other securing access. Thus, cloud computing is a cost effective way to deliver information technology services.

A microservice architecture is commonly adopted for cloud-native applications, and applications using lightweight container deployment. A microservice, or microservice architecture, provides services that are independently deployable. In a microservice architecture, services are fine-grained, and protocols are typically lightweight. This makes a microservice application easy to understand, develop, test, etc. Microservices can be implemented using differing programing languages, databases, and hardware and software environments. Today, microservices are small in size, messaging enabled, bounded by contracts, autonomously developed, independently deployable, decentralized and often built, and released, with automated processes. A microservice is not a layer within a monolithic application, but rather, is a self-contained operation or function, with clear interfaces, and can have its own internal components and implement a layered architecture.

SUMMARY

Certain shortcomings of the prior art are overcome and additional advantages are provided through the provision, in one or more aspects, of a computer-implemented method which includes obtaining, by one or more processors, prior transaction data on one or more of a user's prior transactions on one or more transaction-centric applications, and analyzing, by the one or more processors, the prior transaction data to predict whether a current transaction of the user on an application is deterministic or non-deterministic as to one or more functional layers of multiple functional layers of the application. Based on predicting that current user transaction is deterministic as to the one or more functional layers of the application, the method includes determining, by the one or more processors, compute resource requirements for the deterministic transaction, and launching, by the one or more processors, one or more containers in advance to run the one or more functional layers based, at least in part, on the compute resource requirements of the deterministic transaction.

Systems and computer program products relating to one or more aspects are also described and claimed herein.

Further, services relating to one or more aspects are also described and may be claimed herein.

Additional features are realized through the techniques described herein. Other embodiments and aspects are described in detail herein, and are considered a part of the claimed aspects.

BRIEF DESCRIPTION OF THE DRAWINGS

One or more aspects of the present invention are particularly pointed out and distinctly claimed as examples in the claims at the conclusion of the specification. The foregoing and objects, features, and advantages of one or more aspects of the invention are apparent from the following detailed description taken in conjunction with the accompanying drawings in which:

DETAILED DESCRIPTION

Figure 1:
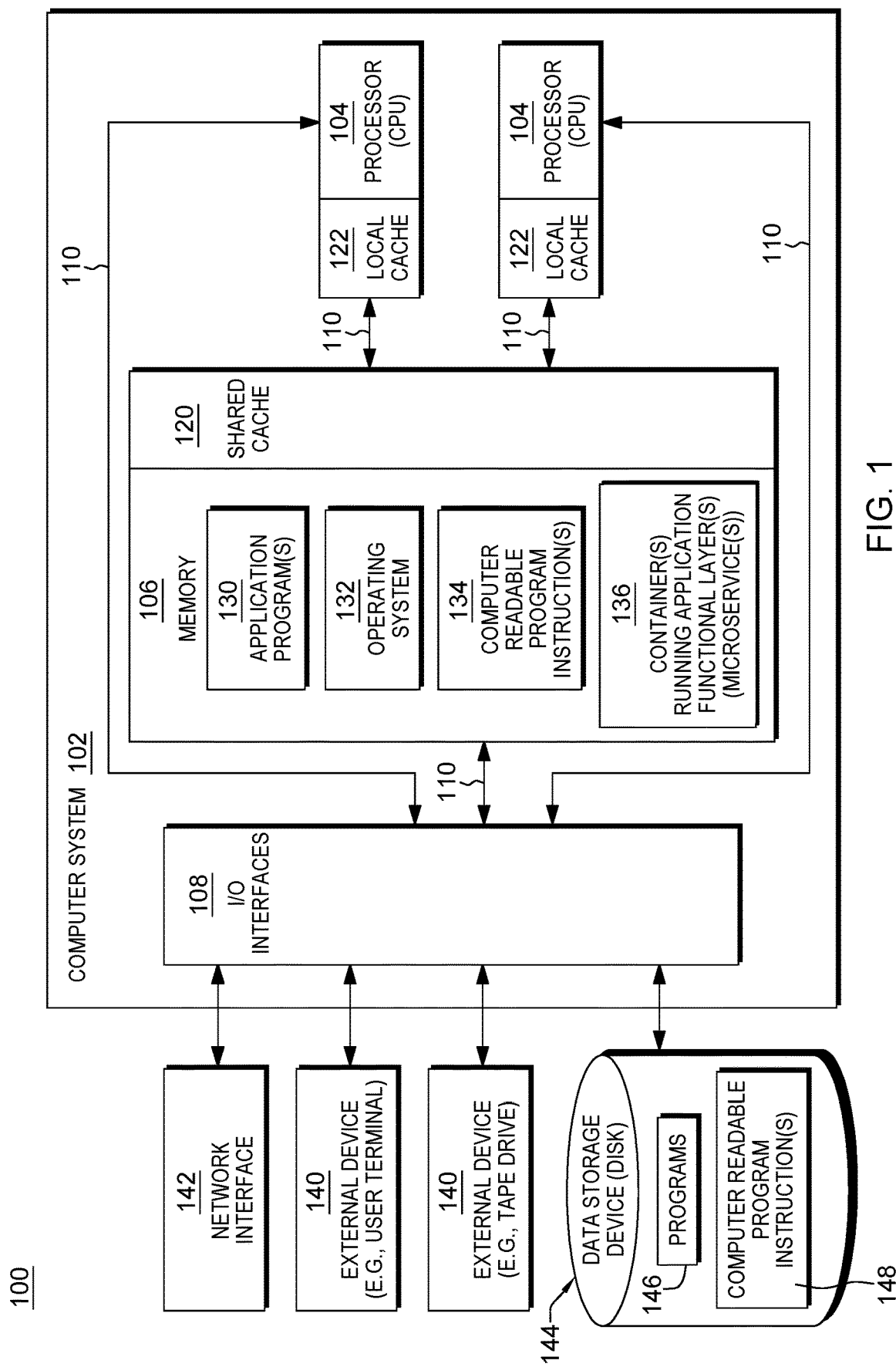
FIG. 1 depicts a block diagram of one embodiment of a data processing system which can implement processing, in accordance with one or more aspects of the present invention.

The accompanying figures, in which like reference numerals refer to identical or functionally similar elements throughout the separate views, and which are incorporated in and form a part of the specification, further illustrate the present invention and, together with the detailed description of the invention, serve to explain aspects of the present invention. Note in this regard that descriptions of well-known systems, devices, processing techniques, etc., are omitted so as to not unnecessarily obscure the invention in detail. It should be understood, however, that the detailed description and this specific example(s), while indicating aspects of the invention, are given by way of illustration only, and not limitation. Various substitutions, modifications, additions, and/or other arrangements, within the spirit or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular embodiment of the concepts disclosed herein.

Note also that illustrative embodiments are described below using specific code, designs, architectures, protocols, layouts, schematics, or tools only as examples, and not by way of limitation. Furthermore, the illustrative embodiments are described in certain instances using particular software, tools, or data processing environments only as example for clarity of description. The illustrative embodiments can be used in conjunction with other comparable or similarly purposed structures, systems, applications, or architectures. One or more aspects of an illustrative embodiment can be implemented in hardware, software, or a combination thereof.

As understood by one skilled in the art, program code, as referred to in this application, can include both software and hardware. For example, program code in certain embodiments of the present invention can include fixed function hardware, while other embodiments can utilize a software-based implementation of the functionality described. Certain embodiments combine both types of program code. One example of program code, also referred to as one or more programs, is depicted in FIG. 1 as computer-readable program instructions 134, as well as application programs 130 and container(s) 136, one or more of which can be stored in memory 106 of computer system 102. Further examples include programs 146 and computer-readable program instruction(s) 148 in data storage device 144 of FIG. 1.

With reference to the figures, and in particular with reference to FIG. 1, an example diagram is shown of a data processing environment in which one or more aspects of illustrative embodiments can be implemented. FIG. 1 is only an example and is not intended to assert or imply any limitation with regard to the environments in which different embodiments can be implemented. A particular implementation may make many modifications to the depicted environment based on the following description.

With reference to FIG. 1, as noted this figure depicts a block diagram of a data processing system in which one or more aspects of the present invention can be implemented. Data processing system 100 is an example of a computer, such as server, or other type of device, in which computer usable program code or instructions implementing one or more processes may be located for the illustrative embodiments.

As shown in FIG. 1, data processing system 100 includes, for instance, a computer system 102 shown, e.g., in the form of a general-purpose computing device. Computer system 102 can include, but is not limited to, one or more processors or processing units 104 (e.g., central processing units (CPUs)), a memory 106 (referred to as main memory or storage, as examples), and one or more input/output (I/O) interfaces 108, coupled to one another via one or more buses and/or other connections 110.

Processor 104 includes a plurality of functional components used to execute instructions. These functional components include, for instance, an instruction fetch component to fetch instructions to be executed; an instruction decode unit to decode the fetched instructions and to obtain operands of the decoded instructions; instruction execution components to execute the decoded instructions; a memory access component to access memory for instruction execution, if necessary; and a write back component to provide the results of the executed instructions.

Bus 110 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 106 can include, for instance, a cache 120, such as a shared cache, which may be coupled to local caches 122 of processors 104. Further, memory 106 can include one or more programs or applications 130, an operating system 132, and one or more computer readable program instructions 134, as well as one or more container(s) to run one or more functional layer(s) 136 (e.g., microservice(s)), which are deployed as discussed herein. Additionally, or alternatively, computer readable program instructions 134 can be configured to carry out one or more other functions of certain embodiments of the invention.

Computer system 102 can also communicate via, e.g., I/O interfaces 108 with one or more external devices 140, one or more network interfaces 142, and/or one or more data storage devices 144. Example external devices include a user terminal, a tape drive, a pointing device, a display, etc. Network interface 142 enables computer system 102 to communicate with one or more networks, such as a local area network (LAN), a general wide area network (WAN), and/or a public network (e.g., the Internet), providing communication with other computing devices or systems.

Data storage device 144 can store one or more programs 146, one or more computer readable program instructions 148, and/or data, etc. The computer readable program instructions can be configured to carry out functions of one or more aspects of the present invention.

Computer system 102 can include and/or be coupled to removable/non-removable, volatile/non-volatile computer system storage media. For example, it can include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 102. Examples, include, but are not limited to: microcode, device drivers, redundant processing units, external disk drive arrays, RAID systems, tape drives, and data archival storage systems, etc.

Computer system 102 can be operational with numerous other general purpose or special purpose computing system environments or configurations. Examples of well-known computing systems, environments, and/or configurations suitable for use with computer system 102 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and cloud computing environments that include any of the above systems or devices, and the like.

As noted, the depicted example of FIG. 1 is not meant to imply architectural limitations. Further, as noted, data processing system 100 of FIG. 1 could be, for instance, a server, workstation, tablet computer, laptop computer, or other computing device.

Modern application architectures often seek to benefit from the development and operational agility offered by microservices hosted in cloud computing environments. A microservice is a small, well defined bit of functionality created by separating off a vertical slice of domain functionality from, for instance, an application, and hosting the service on one or more cloud computing resources. The goal in architecting or re-architecting applications, or critical parts of applications, in this way stems from the notion that smaller units of functionality (e.g., microservices) should possess well-defined and strong contracts to be able to form the basis for a highly available and scalable cloud-based service application program interface (API). Each microservice typically has one responsibility, one strong contract, and it does that one function very well. A microservice of this nature can then be managed by the cloud-hosting environment, usually a container management system, that is then able to scale the microservice for high availability of performance, replicating the microservice across servers (scaling horizontally) or adding memory to containers (scaling vertically).

Figure 2:
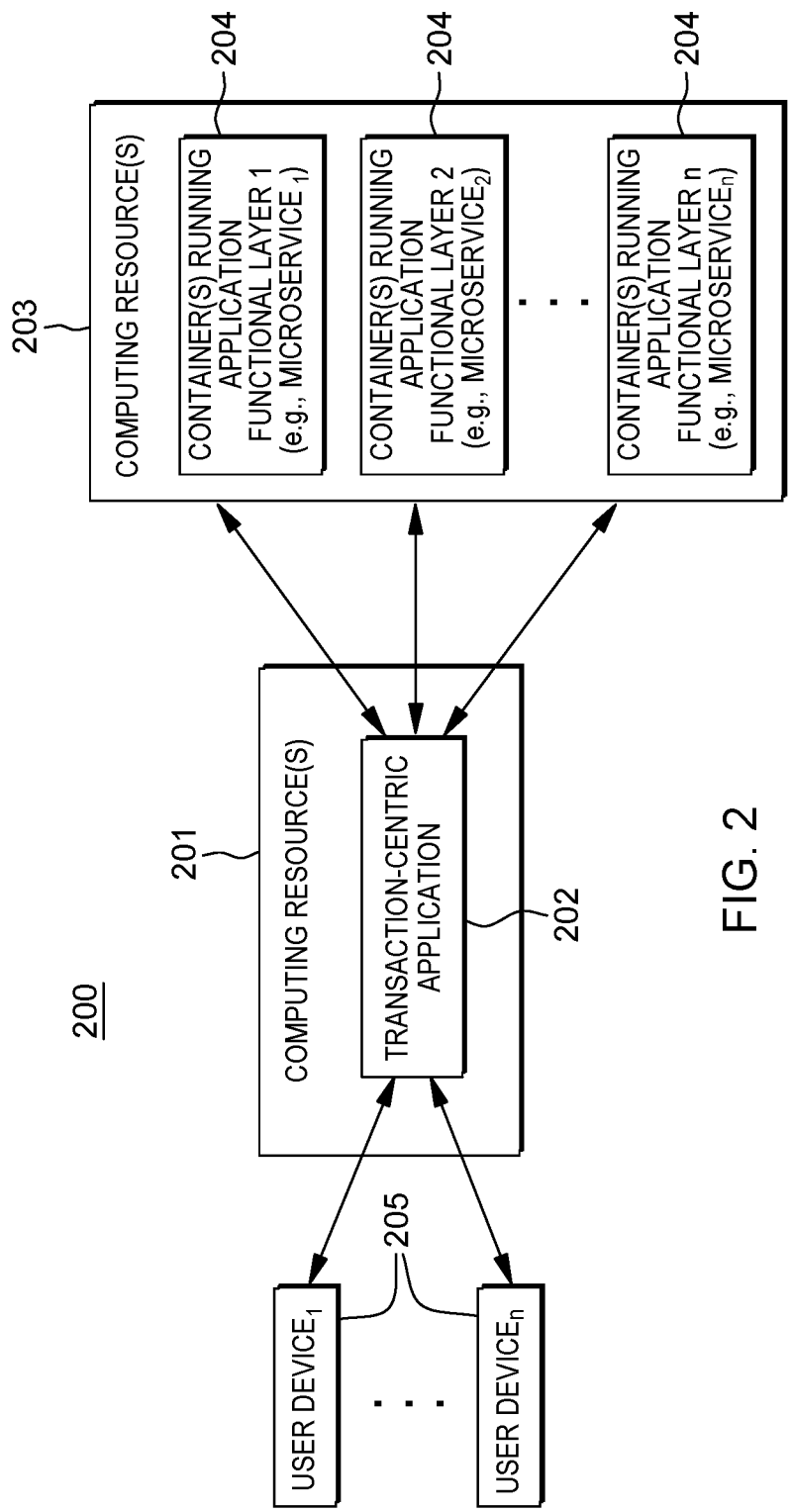
FIG. 2 depicts a computing environment to which various aspects of an embodiment of the present invention can be implemented.
Figure 10:
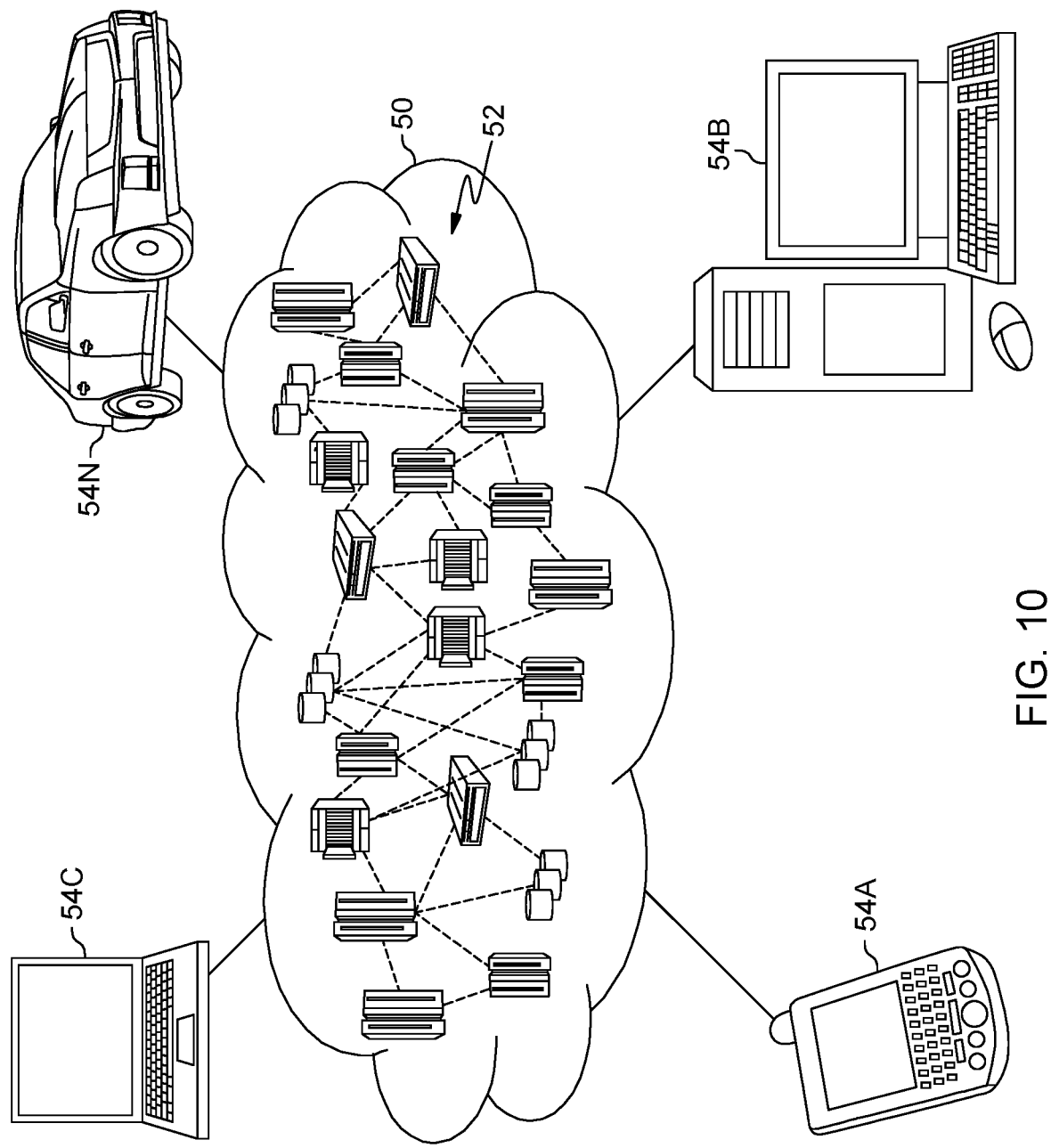
FIG. 10 depicts one embodiment of a cloud computing environment which can facilitate implementing, or be used in association with, certain aspects of an embodiment of the present invention.
Figure 11:
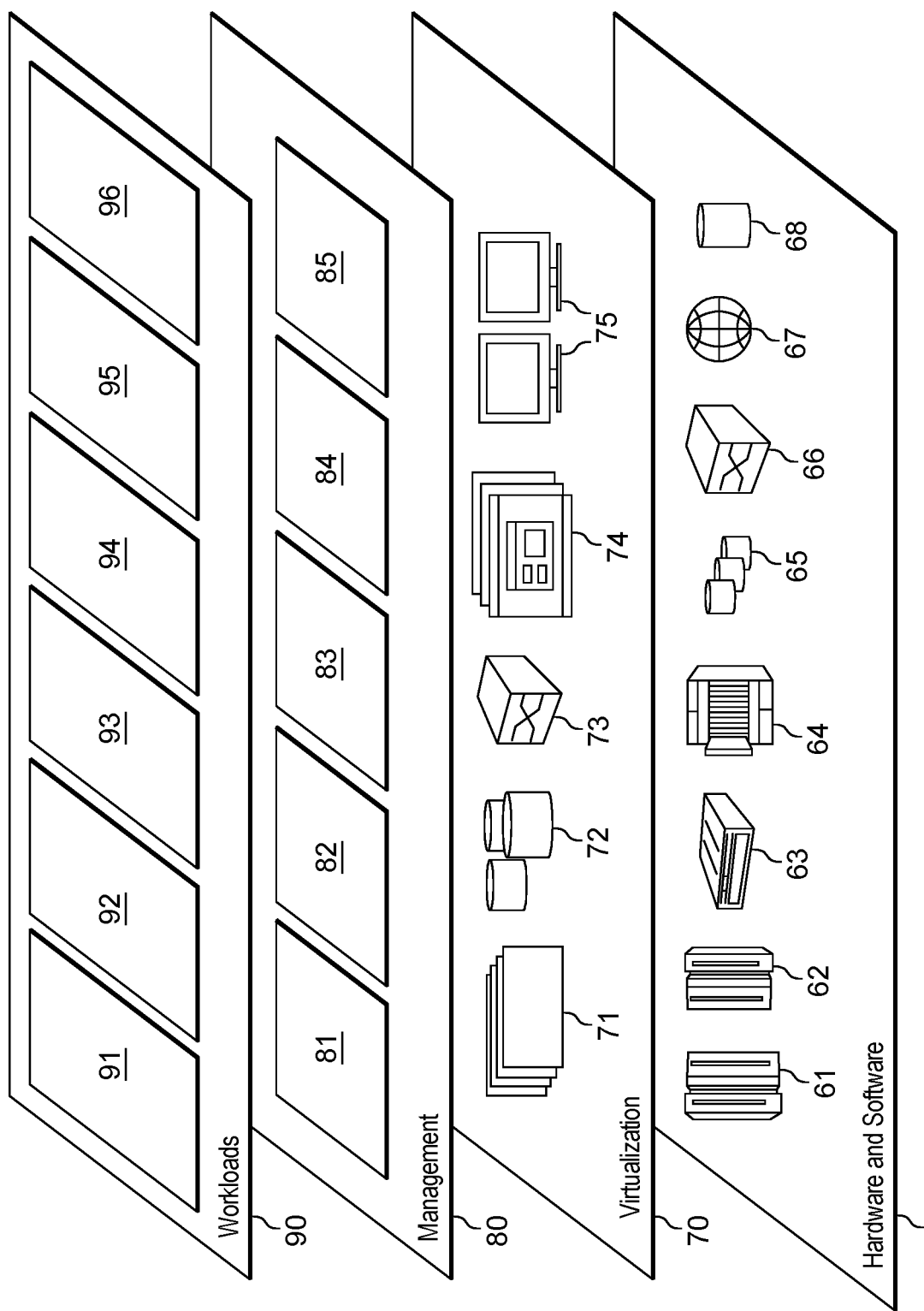
FIG. 11 depicts abstraction model layers according to an embodiment of the present invention.

By way of example, FIG. 2 depicts a generalized computing environment 200, in which various aspects of one or more embodiments of the present invention can be implemented. Computing environment 200 includes computing devices, including one or more computing resources 201 that execute program code of an application 202 (such as a client-server, web-based application or a client-server, business-based application), and one or more computing resources 203 that execute program code associated with one or more functional layers of the application, such as containers running different functional layers (e.g., microservices) 204. In operation, one or more user devices 205 access application 202, during, or a result of which, one or more user transactions access one or more containers implementing one or more functional layers 204 of the application. For illustrative purposes only, application 202 is depicted in FIG. 2 as being housed on separate computing resource(s) 201 than computing resource(s) 203 hosting the container-implemented functional layers (e.g., microservices) 204. This is a non-limiting example of an implementation, and in one or more other embodiments, the program code of application 202 and containers 204 could also share computing resource(s) and/or share a cloud computing environment. The computer resources 201, 203 can be based on a variety of computing system environments or configurations, such as the computer systems of FIGS. 1, 10 & 11 presented herewith.

As noted, containers running microservices offer many benefits, as they are highly decoupled, scalable, discoverable, and easy to work with for development and operations. In view of these benefits, and others, computer architects continue to take advantage of such a platform to perform a wide variety of computing applications.

The rapid adoption of container technologies, augmented with cloud infrastructure, to cater to real-time need for scalable, efficient, resilient, fault tolerant, and high availability system applications is not visibly adopted in the production environments of certain mission-critical applications. Today, many organizations realize that containers are beneficial in the non-production environments due to flexibility and pace. However, in production environments, there is a high level of uncertainty around whether the containers would meet an increased demand without disruption. The current container adoption framework does not guarantee efficient, accurate, on-time (with zero fractional gap) demand, and supply balance of compute resources to ensure little or no impact on the business, user experience, transactions, interactions of landscapes, and organizational processes. The existing container scaling approaches fit well with a static or least-variance of user behavior and transactions. However, when user actions and transactions are dynamic in nature, uncertain through an end commit, the existing container deployment frameworks can be insufficient.

In particular, existing auto-scaling techniques for containers are unable to address changing workload intensity over time, resulting in either resource under-provisioning, in which case the application suffers from low performance, or resource over-provisioning, in which case utilization of allocated resources is low, impacting the cost benefits derived by adoption of containers. Many existing auto-scaling approaches use rules with fixed thresholds, which are almost exclusively based on infrastructure-level metrics, such as current CPU utilization. This includes auto-scaling methods employed by commercial cloud providers and open source container orchestrators built on the Kubernetes® platform. Kubernetes is a registered trademark of the Linux Foundation, San Francisco, Calif., USA. As known, the Kubernetes platform is an open-source, container-orchestration system for automating application deployment, scaling, and management. It works with a range of container tools. Many cloud services offer a Kubernetes-based platform of infrastructure as a service (PaaS or IaaS), on which Kubernetes can be deployed as a platform-providing service. Although such methods can be useful for non-transactional applications deployed on a cloud-based resource, their performance and resource utilization drops for CPU, memory, and network-intensive, time-critical applications. More particularly a variety of scaling approaches or mechanisms exist around container-based processing. For instance, the Kubernetes platform is a horizontal auto-scaling approach which scales the number of containers (e.g., pods) in a replication controller, deployment or a replica set, based on observed CPU utilization. The horizontal pod auto-scaler is implemented as a control loop where periodically the controller manager queries the resource utilization against the metric specified in the horizontal pod and auto-scaler definition, and calculates the mean of the utilization across all the targeted pods, and produces a ratio used to scale the number of desired replicas.

In another approach, target tracking scaling policies can be used, which simplify how dynamic scaling is configured. A predefined metric is selected, or a customized metric and set of target values are configured, and the scaling policy adds or removes capacity as required to keep the metric at, or close to, the specified target value.

In a further approach, step-scaling can be used, where the number of container instances can be gradually increased or decreased based on CPU utilization ranges. For instance, if the utilization is 5% above an average utilization, then step-scaling can spawn an additional container. If the utilization is 10% above the average utilization, then step-scaling can spawn two or more additional containers, and similarly, container instances can be decreased.

In another approach, a container auto-scaler can be used with one of multiple policies, such as based on CPU utilization, load balancer serving capacity, or various other performance-based metrics, and the auto-scaler scales the number of containers based on the policy that provides, for instance, the largest number of virtual machines and/or containers of the group.

In one or more implementations, an application, such as a business application, has multiple functions or functional layers, and one or more of these functional layers can (for instance) be developed as a microservice running on a container. By way of example, an application might be deployed with a defined compute size up to, for instance, 1,000 concurrent users, which might translate to a specified number of containers per functional layer. This is referred to as a reserved configuration. As the number of concurrent users increase, there is typically a static growth across the functional layers, with the number of containers increasing, based on an arithmetic progress X multiplied by z number of containers. This configuration is referred to as an on-demand configuration, where there is a static and uniform growth in containers catering to all of the business functions of the application. In a large volume environment, such as on a large sale day, the number of containers can scale beyond the threshold to the maximum limit, such as 100×z containers per functional layer. This configuration is referred to as an extended configuration, where the application requires the maximum capacity to function.

Figure 3:
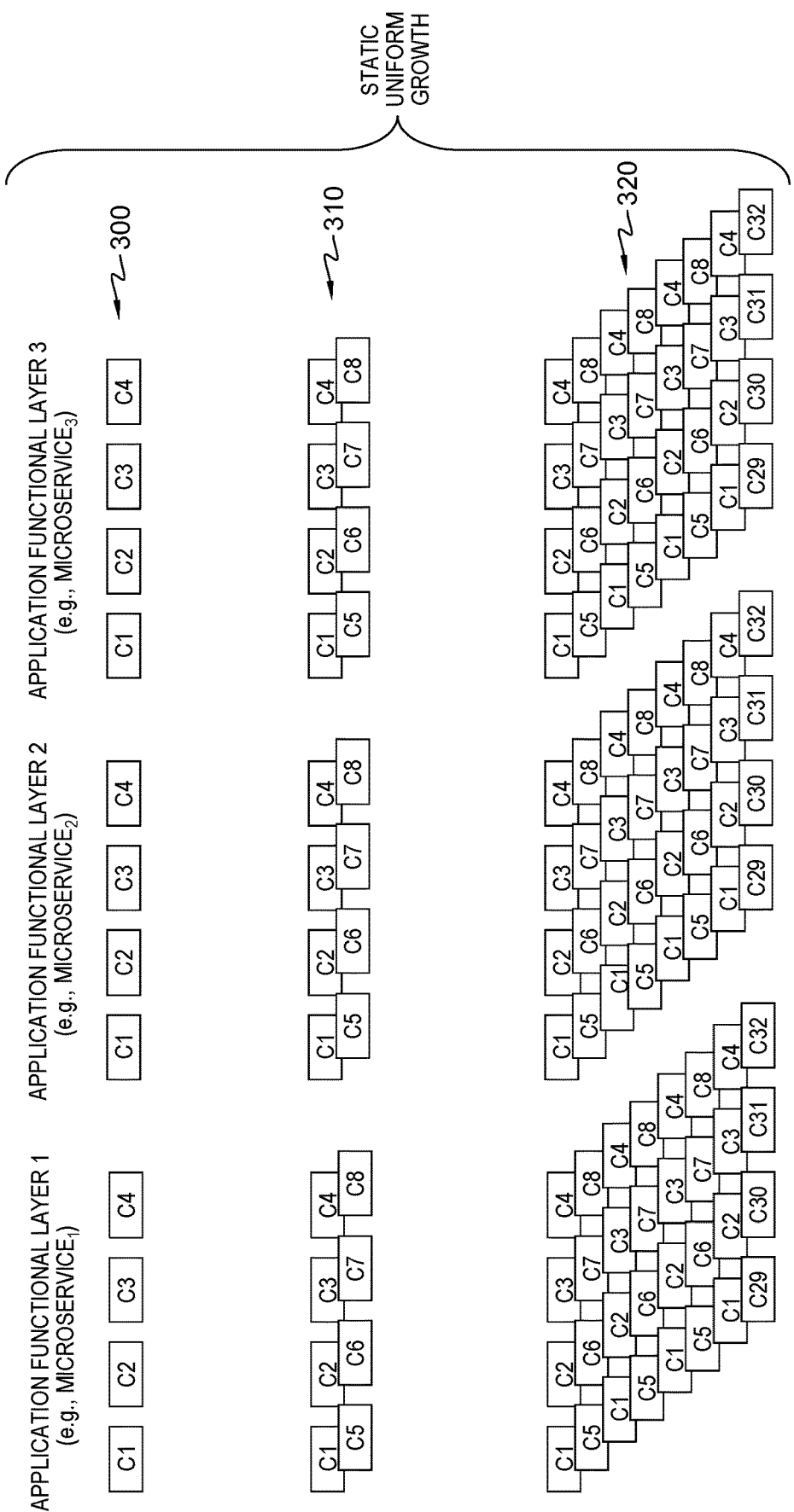
FIG. 3 depicts one embodiment of an existing container deployment strategy for containers running functional layers of an application.

By way of example, FIG. 3 illustrates the above-noted scenarios, where an application, such as a business application, has three functional layers, application functional layer 1, application functional layer 2, and application functional layer 3, one or more of which can be developed as respective microservices running on respective containers. FIG. 3 illustrates the current deployment strategies for reserved configuration, on-demand configuration, and extended configuration. For reserved configuration 300, the number of containers remains constant across the functional layers, and is dependent on the number of concurrent users. In the example of FIG. 3, 1000 concurrent users might require four containers per functional layer running the respective microservice. In the on-demand configuration 310, a doubling of the number of concurrent users is shown to result in a static increase in the configuration across all functional layers, that is, there is an arithmetic progressive increase in the number of containers. In the extended configuration 320 of FIG. 3, on large volume days, deployment can go beyond the threshold for a max limit, with a static uniform increase across all functional layers, resulting in an arithmetic progressive increase in the number of containers. These static uniform growth approaches, although working well with static user transactions, do not function efficiently where the user's transactional history is dynamic in nature, being uncertain through an end commit functional layer. More particularly, exiting container scaling policies and processes are dependent on infrastructure-level metrics, such as CPU utilization, or application-level metrics, such as response time or throughput, which can be insufficient for the demands of real-time, mission critical applications.

In accordance with one or more aspects of the present invention, computer-implemented methods, systems, and computer program products are provided which output auto-scaling rules for containers dynamically, depending on the application and prior transaction data of the current users of the application. For instance, a system is disclosed herein which outputs auto-scaling rules during runtime for a more fine-grained reaction to workload fluctuations that automatically adjust thresholds, depending on the execution environment status observed by one or more probabilistic prediction algorithms. In one embodiment, historical trends of a user's prior actions on one or more transaction-centric applications (such as the current application) are collected, or obtained as prior transaction data, which is used to derive application characteristics for the current user(s), and to correlate the user's prior actions to an indication of the number of containers needed to run the respective layers of the application. In one embodiment, user transactions are routed through a probabilistic model, which analyzes the prior transaction data trends for each user, and determines whether the current transaction of each particular user is deterministic or non-deterministic as to one or more functional layers of the application. In one or more implementations, the analyzing and predicting can be continuously performed at runtime of the current transaction, or, performed at one or more discrete intervals during transaction processing, such as with login.

For deterministic transactions, the real-time compute resource requirements are then determined, and processing ensures resource availability at time of demand by outputting the necessary auto-scaling rules for launching the appropriate number of containers (or pods). In Kubernetes deployment, the model updates the horizontal pod auto-scaler definition. The Horizontal Pod Auto-Scaler in Kubernetes scales the number of pods in a replication controller, deployment, or replica set based on the output. The Horizontal Pod Auto-Scaler in Kubernetes is implemented as a control loop, where periodically the controller manager queries the requirements specified in the horizontal pod auto-scaler definition. For non-deterministic transactions, no additional computation or launching of containers is currently required or to be performed. For every transaction determined to be deterministic, one or more containers can be launched as appropriate, based on the compute resource requirements determined. Any deviation from a previously deemed deterministic (or non-deterministic) transaction can be fed back to the probabilistic model to, for instance, refine one or more of the auto-scaling rules. Further, the process can be continuous, in one or more embodiments, in that a user transaction can be evaluated at multiple functional layers (or stages) of the application. For instance, in one or more embodiments, a current user transaction can initially be determined to be non-deterministic based on the user's prior transaction data, such as with the user at functional layer 1 of the application, but once the user reaches functional layer 2, the analyzing may then predict that the user is likely to proceed to functional layer 3 of the application, in which case, processing can launch one or more containers in advance for running a functional layer 3 instance, or microservice, based on the now deterministic nature of the user transaction. Note in this regard that "deterministic" refers to, in one or more embodiment, there being a likelihood that a user transaction will proceed to use the one or more functional layers of the application, and "non-deterministic" means that the analyzing is unable to predict, for instance, based on a probabilistic model, whether the current user's transaction is likely to require the one or more functional layers of the application. As described herein, the likelihood of whether the current user transaction will proceed to use one or more functional layers of the application is based on the prior transaction data obtained or retrieved from that user's history with the application, or one or more similar applications. Note further that the prior transaction data can be trend-based data. In one or more implementations, the prior transaction data can be data obtained over a recent time interval, for instance, for the last month, the last six months, etc., or could be based on the most recent N transactions engaged by the user.

Advantageously, embodiments disclosed herein provide an approach to scaling the number of containers in line with the true nature of one or more current user's prior actions on the application (or similar applications), instead of the static methods described above, which are mainly based on infrastructure metrics or application throughput/response time. Further, the approaches disclosed herein reduce costs at a granular layer of transactions, and ensure no disruption to the application, or user experience as the number of concurrent users increase. Guaranteed and consistent application performance, regardless of the user demand, is provided, ensuring a risk reduction to organizations and entrepreneurs. Further, the approaches disclosed herein pave the way for innovative "pay per transaction" compute models.

Figure 4:
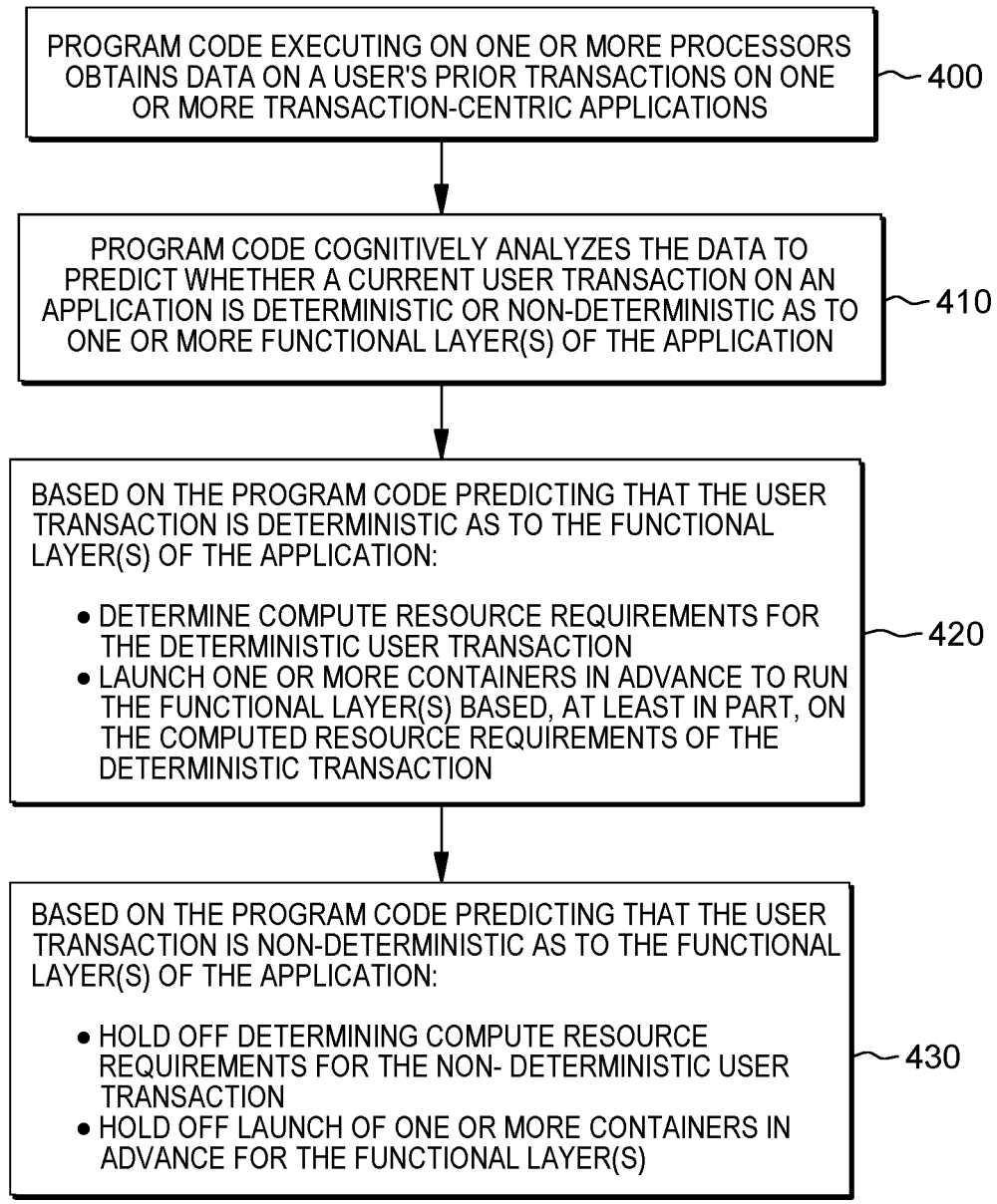
FIG. 4 depicts a workflow illustrating certain aspects of an embodiment of the present invention.

As illustrated in FIG. 4, embodiments of the present invention include a computer-implemented method, a system, and/or a computer program product, where program code executing on one or more processors obtains prior transaction data on one or more of a user's prior transactions on one or more transaction-centric applications 400. Program code cognitively analyzes the prior transaction data to predict whether a current transaction of the user on an application is deterministic or non-deterministic as to one or more functional layers of multiple layers of the application 410. Based on the program code predicting that the current transaction is deterministic, then program code determines compute resource requirements for the deterministic transaction, and launches one or more containers in advance to run the one or more functional layers based, at least in part, on the compute resource requirements of the deterministic transaction to ensure success of user transaction 420. Further, based on the program code predicting that the current transaction is non-deterministic, then processing holds off determining compute resource requirements for the non-deterministic transaction, and holds of launching one or more containers of the one or more functional layers in advance for the currently non-deterministic transaction 430. Further details of one or more aspects of one or more embodiments of the present invention are described below with reference to FIGS. 5-9B, by way of example.

Embodiments of the present invention are inextricably tied to computing, and provide significantly more than existing approaches to auto-scaling launch of containers running functional layers of an application. For instance, embodiments of the present invention provide program code executing on one or more processors to exploit the interconnectivity of various systems, as well as to utilize various computing-centric data analysis and handling techniques, in order to predict during runtime whether one or more current transactions on an application are deterministic or non-deterministic as to one or more container-implemented, functional layers of the application, and to determine, based on predicting that the transaction is deterministic, compute resource requirements for the deterministic transaction(s), and to launch one or more containers for the one or more functional layers based on the computed resource requirements of the deterministic transaction(s) in advance to ensure resources for the user transaction(s). Both the interconnectivity of the computing systems utilized, and the computer-exclusive data processing techniques and processes implemented by the program code enable various aspects of the present invention. Further, embodiments of the present invention provide significantly more functionality than existing approaches to scaling containers for functional layers of applications because, in embodiments of the present invention, the program code predicts at runtime, based on prior transaction data analysis, whether a particular transaction is deterministic or non-deterministic as to one or more of the container-implemented, functional layers of the application, and based on the transaction(s) being deterministic, the program code scales the number of containers by determining compute resource requirements for the deterministic transaction(s), and launching one or more containers with the one or more functional layers based on the computed resource requirements of the deterministic transaction(s) in advance to ensure success of the user transaction.

In embodiments of the present invention, the program code provides significantly more functionality, including but not limited to: 1) program code that obtains prior transaction data related to one or more of a user's prior transactions on one or more transaction-centric applications; 2) program code that analyzes the prior transaction data to predict whether a current transaction on an application is deterministic or non-deterministic as to one or more container-implemented, functional layers of the application; and 3) program code that, based on predicting that the current transaction is deterministic, determines compute resource requirements for the deterministic transaction, and launches one or more containers of the one or more functional layers based on the computed resource requirements of the deterministic transaction in advance to ensure success of the user transaction.

Figure 5:
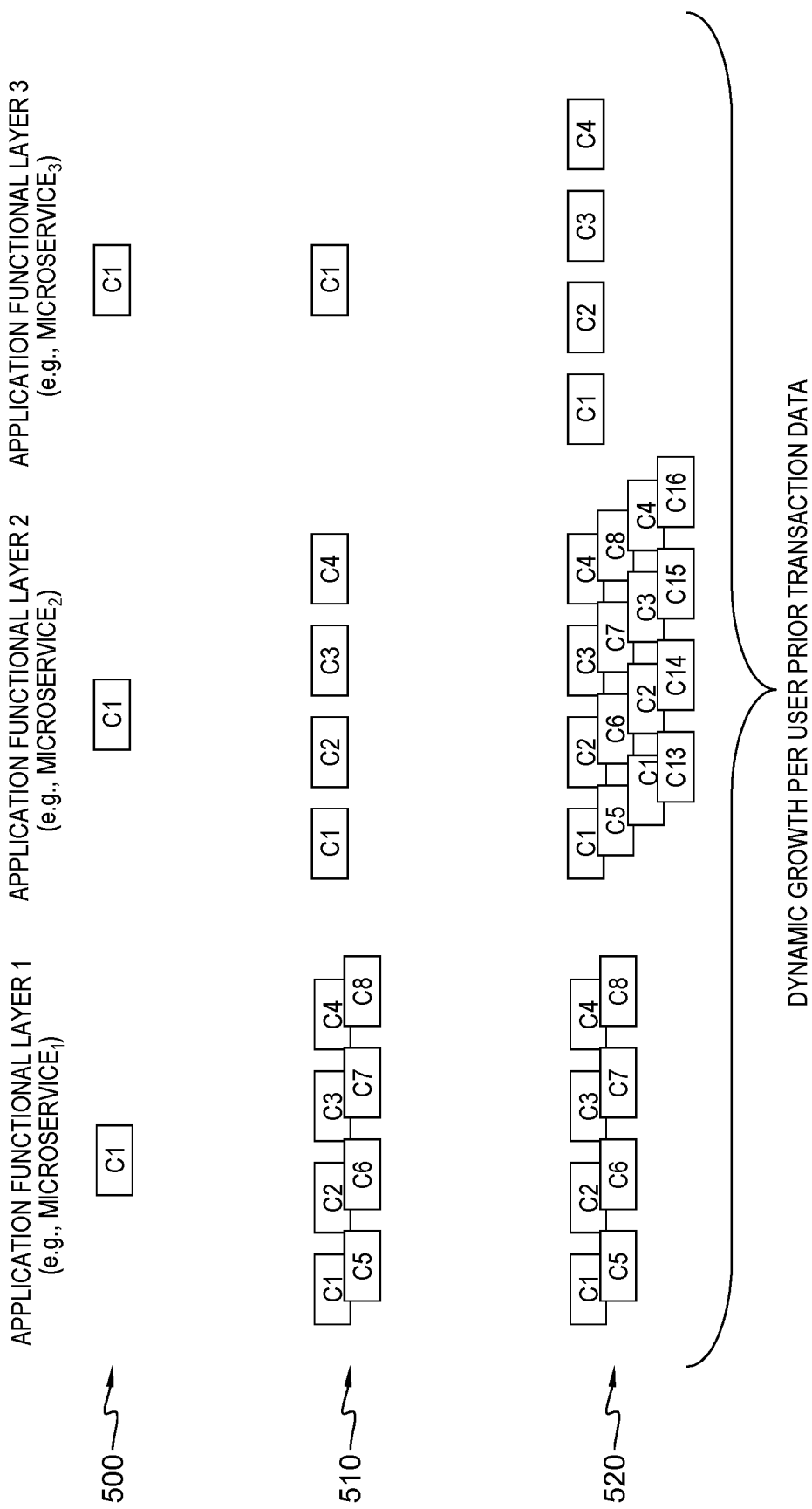
FIG. 5 depicts one embodiment of container deployment for containers running functional layers of an application based on a workflow such as depicted in FIG. 4, in accordance with one or more aspects of the present invention.

FIG. 5 depicts one embodiment of scaling of container-implemented layers of an application based on data analysis to predict dynamically during runtime whether transactions are deterministic or non-deterministic, in accordance with one or more aspects disclosed herein. In FIG. 5, the reserved configuration, on-demand configuration, and extended configuration examples of FIG. 3 are repeated, but with probabilistic analysis (running, for instance, as a container) providing trend data analysis of the current user's most recent prior transactions and, correlating that data to container deployment at one or more functional layers of the application, in accordance with one or more aspects disclosed herein.

In the reserved configuration 500 of FIG. 5, one container per business function layer might be reserved at application initialization. As users log onto the application, and the number of users exceeds the ability of the one container, a dynamic reconfiguration occurs using the probabilistic data analyzing disclosed herein, where prior user transaction data is analyzed (for instance, for recent transaction-centric applications accessed by the users), and processing determines from that analysis the number of containers to be spawned. In one or more embodiments, the program code passes the determination as auto-scale rules to a Kubernetes orchestrator. For instance, in the on-demand configuration 510, as more users access the application, the prior transaction data for those users is analyzed, and based on the data analysis for the actual users logged into the application at that time, the appropriate number of containers are spawned for each of the functional layers of the application.

By way of example, while functional layer 1, such as a browse layer, might require a full complement of containers, the subsequent functional layer 2 and functional layer 3 might only require 50% of the containers and 10% of the containers of functional layer 1, respectively, again based on the analyzing of the users' prior transaction data. Thus, the number of containers executing is reduced, and the overall consumption of computer resources is reduced, optimizing the employed resources per the current application needs based on the historical trends of the current users of the application. Note in this regard that, different concurrent users might require different numbers of containers per functional layer of the application, depending those users' prior transaction history. Also, note that, for a particular user, the data on the user's transactions changes over time, and thus, the data can be considered trend data, representative of the particular user's trending requirements for transactions. For instance, in prior years, a particular user might only have browsed, but in the current year, or, for a last defined number of transactions, the current user is more likely to complete a successful transaction with one or more transaction-centric applications. In that case, the probabilistic model adjusts over time with feedback to capture this change, as explained herein.

In the extended configuration, such as on large use days, where processing goes beyond the threshold for a max limit, the probabilistic algorithm determines the number of containers required per functional layer, where the number of containers required for a functional layer can also depend on the particular function or microservice executing within the instantiated container. The result is a dynamic growth, or contraction, in the number of containers, tailored to or based on the user's (or the multiple concurrent users') prior transaction data on one or more transaction-centric applications. Note that, in one particular implementation, the one or more transaction-centric applications could be the application that the user transaction is currently on. In other embodiments, a plurality of transaction-centric applications could be evaluated by the program code to collect, obtain, retrieve, etc., the user's prior transaction data on those applications, such as, for instance, the last 10 times, 100 times, etc., that the user accessed the application(s), and what computing resources were required, as well as what application functional layers were used to service the user transaction(s).

Figure 6:
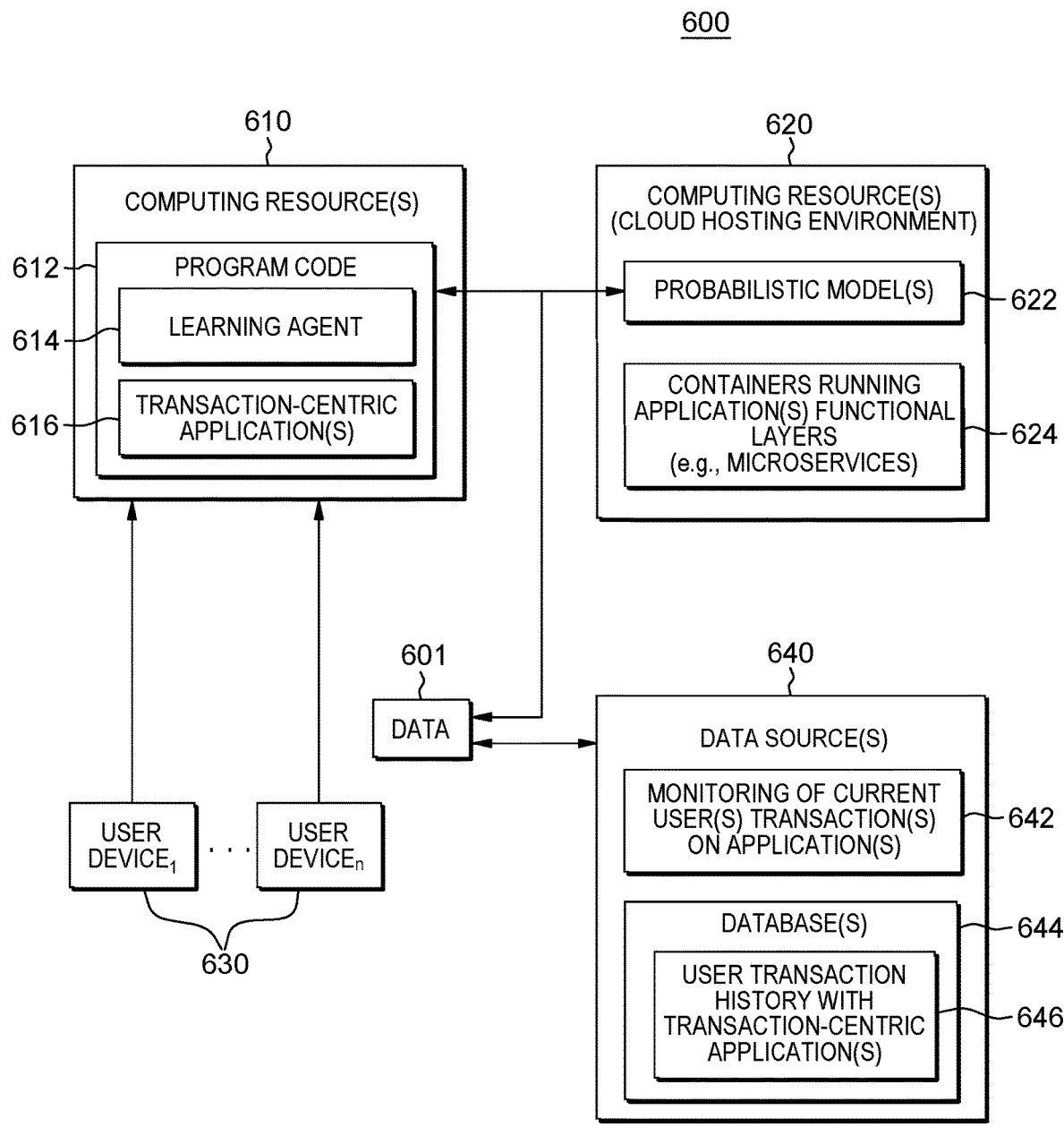
FIG. 6 depicts one embodiment of a system, illustrating certain aspects of an embodiment of the present invention.

FIG. 6 depicts a further embodiment of a technical environment or system 600 into which various aspects of some embodiments of the present invention can be implemented. System 600 includes, by way of example, various computing devices, including one or more computing resources 610, one or more computing resources 620, one or more user devices 630, and one or more data sources 640, by way of example. In the embodiment illustrated, computing resource(s) 610 executes program code 612 that generates, or updates, one or more probabilistic models 622 based on machine learning (e.g., via a cognitive and/or learning agent 614), and utilizes the model(s) 622 to generate scaling rules for one or more containers to run application functional layers 624 for one or more transaction-centric applications 616. In the embodiment depicted, computing resource(s) 620 could be one or more computing resources of a cloud hosting environment. As explained herein, the probabilistic model(s) 622 is used by the program code 612 to predict whether a current transaction on an application is deterministic or non-deterministic as to one or more container-implemented, functional layers of multiple functional layers of the application. This predicting is based on prior transaction data on one or more of a user's prior transactions on one or more transaction-centric applications, such as the particular application at issue, or other transaction-centric applications. By way of example, in one embodiment, probabilistic model(s) 622 can consider transaction data for the N-most recent user transactions on the application or other similar applications with, for instance, a comparison of the historical data against a threshold, such that, for instance, if greater than 50% of the time the user transaction resulted in requiring the one or more application layers, then the current transaction is considered deterministic as to those layers.

Further, the probabilistic model(s) 622 allows for evaluation of multiple concurrent transactions in order to automatically control scaling of, for instance, containers in advance for running of the one or more functional layers, based at least in part, on the computed resource requirements for the deterministic transaction(s) of the multiple concurrent transactions. As explained, for any user transaction(s) considered non-deterministic, then processing holds off determining compute resource requirements for those transactions, and holds off launching one or more containers in advance for one or more functional layers of the application based on the non-deterministic transaction.

For illustrative purposes only, model(s) 622 and containers 624 are illustrated in FIG. 6 as being housed on separate computing resource(s) 620 from program code 612 executing on computing resource(s) 610. This is a non-limiting example of an implementation. Note that one or more aspects of the program code 612, learning agent 614, transaction-centric application(s) 616, probabilistic model(s) 622, and containers running application functional layers 624, could be implemented on the same computing resource(s), or the associated program code could be divided otherwise than as illustrated in FIG. 6. For instance, various modules of program code 612 could be executed on different resources in various embodiments of the present invention, and thus, for instance, learning agent 614 and program code 612 can be separate modules, if desired.

Where computing resource(s) 610 and computing resource(s) 620 are different computing resources, the resources can be in communication across one or more networks, as can the user device(s) 630 and/or the data source(s) 640. By way of example, the network(s) can be, for instance, a telecommunications network, a local area network (LAN), a wide area network (WAN), such as the Internet, or a combination thereof, and can include wired, wireless, fiber optic connections, etc. The network(s) can include one or more wired and/or wireless networks that are capable of receiving and transmitting data, including data relating to current transactions and prior user transactions, with the application at issue, or one or more other transaction-centric applications.

In certain embodiments of the present invention, program code 612 uses, along with probabilistic model(s) 622, data 601 from one or more data sources 640, including, transaction data from monitoring the current user transaction(s) on the application(s) 642, as well as prior transaction data from one or more databases 644, such as data on the user's prior transaction history on one or more transaction-centric applications 646. For instance, in one or more embodiments, probabilistic model(s) 622 can receive as input data on the user's prior transactions previously collected and retained in database 644 indicative of the compute resource requirements of the prior user transactions for correlating by the program code to the number of current containers needed, including determining how to auto-scale container instances of one or more functional layers of the current application.

In one or more implementations, computing resource(s) 610 houses and/or executes program code 612 and computing resource(s) houses or executes probabilistic model(s) 622, which are together configured to perform methods in accordance with one or more aspects of the present invention. By way of example, computing resource(s) 610 and computing resource(s) 620 can each be a server or other computing-system-implemented resource(s) that are, in one or more embodiments, separate from one or more user devices 630 utilized by the users to access one or more transaction-centric applications 616, such as executing on computer resource(s) 610.

Briefly described, computing resource(s) 610 (as well as computing resource(s) 620 and/or user devices 630) can include one or more processors, for instance, central processing units (CPUs). Also, the processor(s) can include functional components used in the integration of program code, such as functional components to fetch program code from locations such as cache or main memory, decode program code, and execute program code, access memory for instruction execution, and write results of the executed instructions or code. The processor(s) can also include a register(s) to be used by one or more of the functional components. In one or more embodiments, the computing resource(s) can include memory, input/output, a network interface, and storage, which can include and/or access, for instance, data 601 from data sources 640, including one or more databases 644. The components of the computing environment can be coupled to each other via one or more buses and/or other connections. Bus connections can be one or more of any of several types of bus structures, including a memory bus or a memory controller, a peripheral bus, an accelerated graphics port, and a processor or local bus, using any of a variety of bus architectures. By way of example, and not limitation, such architectures can include the industry standard architecture (ISA), the micro-channel architecture (MCA), the enhanced ISA (EISA), the video electronic standard association (VESA), local bus, and peripheral component interconnect (PCI). Examples of the computing resource(s) or computer system(s) which can implement one or more aspects disclosed are described in greater detail with reference to FIGS. 1 & 10-11. Note also that, depending on the implementation, one or more aspects of the computing resource(s) can be associated with, licensed by, subscribed to by, etc., a company or organization operating, owning, etc., one or more of the transaction-centric applications 616.

Program code 612 executing on computing resource(s) 610 obtains data relating to initiation of a user transaction on an application 616 using a user device 630. As noted above, transaction data can be generated based on the user's current transaction, and the transaction data can be used by learning agent 614 to continually learn (in one embodiment) and update the patterns that form probabilistic model(s) 622. In some embodiments, program code 612 executing on one or more computing resources 610 applies machine learning algorithms to generate and train model(s) 622, which the program code 612 then utilizes to determine, for instance, whether the current user transaction on an application is deterministic or non-deterministic as to one or more functional layers of the application. Based on the program code predicting that the user transaction is deterministic as to the one or more functional layers (i.e., likely to require), the program code determines computed resource requirements for the deterministic transaction, and launches one or more additional containers in advance to run the one or more functional layers based, at least in part, on the computed resource requirements of the deterministic transaction.

In an initialization or learning stage, program code 612 can train the model(s) 622, based on patterns and available prior transaction data, as well as currently obtained transaction data based on monitoring the user transaction with the application 642. As illustrated, prior user transaction data 646 from different user's prior transactions on one or more transaction-centric applications can be retrieved by the program code from one or more databases 644. As part of this, program code 612 can construct one or more relational data structures or auto-scaling rules that map, for instance, prior user actions with respect to one or more prior transactions to likely actions of the user in connection with the current transaction, and based on this, to compute the resource requirements for the current transaction.

In one or more embodiments, a machine learning training system can be utilized to perform cognitive analysis of various inputs, including various data inputs such as described herein, as well as any body of application-specific knowledge. The training data utilized to train the model in embodiments of the present invention can include a variety of types of data, as described. The program code in embodiments of the present invention can perform a cognitive analysis to generate data structures, including algorithms utilized by the program code to provide, for instance, a prediction on whether a current transaction of a user on an application is deterministic or non-deterministic as to one or more functional layers of multiple functional layers of the application, and based on predicting that the current transaction is deterministic as to the one or more functional layers, to determine compute resource requirements for the deterministic transaction, and launch one or more containers in advance to run the one or more functional layers based, at least in part, on the computed resource requirements. Machine learning (ML) solves problems that cannot be solved by numerical means alone. In a ML-based example, program code extracts various features/attributes from training data (e.g., data collected from a variety of data sources relevant to the prediction(s), resource requirement(s), auto-scaling rule(s), etc.), which can be resident in one or more places, including, within the data source(s) 640, as discussed. The features are utilized to develop a predictor function, also referred to as a hypothesis, which the program code utilizes to train the machine learning model.

In predicting whether a current transaction of a user on an application is deterministic or non-deterministic as to one or more functional layers of multiple functional layers of the application, prior transaction data on one or more of the user's prior transactions on one or more transaction-centric applications can be used, as can transaction data obtained from the current transaction. In identifying a probability that a particular transaction is deterministic or non-deterministic, the program code can utilize various techniques to select features (elements, patterns, attributes, etc.) including, but not limited to, diffusion mapping, principal component analysis, recursive feature elimination (a brute force approach to selecting features), and/or a Random Forest, to predict whether the current transaction is deterministic, and if so, to determine compute resource requirements for the deterministic transaction, and launch one or more containers in advance to run the one or more functional layers based, at least in part, on the computed resource requirements of the deterministic transaction. The program code can utilize a machine learning algorithm to train the machine learning model (the algorithms utilized by the program code), including providing rankings or weights for extracted data for inclusion, so that the program code can train the predictor or recommendation functions to include in the machine learning model. The conclusions can be evaluated by a quality metric. By selecting an appropriate set of training data, the program code trains the machine learning model to identify and weight various attributes (e.g., features, patterns) that correlate (for example) prior transaction data of one or more user's prior transactions on the application, or on one or more other transaction-centric applications, to scaling of the number of containers currently required to execute the application for the particular users with current transactions on the application.

The model 622 can be self-learning, as program code 612 updates model 622 based on feedback received during transaction processing, particularly at the learning phase. For example, when program code 612 determines that a predicted non-deterministic transaction becomes deterministic, program code 612 can utilize learning agent 614 to update model 622 to reflect the change, in order to improve future predictions and/or scaling. In certain embodiments, program code 612 includes or utilizes learning model 614, which cognitively analyzes any new data deviating from model 622, and adjusts model 622 to improve the model moving forward.

In some embodiments of the present invention, program code 612 executing on one or more computing resources 610 utilizes existing cognitive analysis tools or agents to create, and tune, model 622, based, for instance, on data obtained from the various data sources. Some embodiments of the present invention can utilize IBM Watson® as learning agent 614 (i.e., as a cognitive agent). IBM Watson® is a registered trademark of International Business Machines Corporation, Armonk, N.Y., USA. In embodiments of the present invention, program code 614 interfaces with IBM Watson® application programming interfaces (APIs) to perform cognitive analysis of obtained data. In some embodiments of the present invention, program code 612 interfaces with the application programming interfaces (APIs) that are part of a known cognitive agent, such as the IBM Watson® application program interface (API), a product of International Business Machines Corporation, to determine impacts of data on the model and to update the model, accordingly.

In some embodiments of the present invention, certain of the APIs of the IBM Watson® API include a cognitive agent (e.g., learning agent) that includes one or more programs, including, but not limited to, natural language classifiers, Retrieve and Rank (i.e., a service available through the IBM Watson® developer cloud that can surface the most relevant information from a collection of documents), concepts/ visualization insights, tradeoff analytics, document conversion, natural language processing, and/or relationship extraction. In an embodiment of the present invention, one or more programs can be provided to analyze data obtained by program code 612 across various sources utilizing one or more of a natural language classifier, Retrieve and Rank APIs, and tradeoff analytics APIs. In operation, the program code 612 can provide predictions or recommendations based on one or more current transactions on application 616.

In some embodiments of the present invention, program code 612 utilizes a neural network to analyze collected data relative to a user to generate model 622, for use in predicting whether the current transaction of a user on an application is deterministic or non-deterministic as to one or more functional layers of multiple functional layers of the application, and based on the predicting that the current transaction is deterministic, to determine compute resource requirements for the deterministic transaction, and launch one or more containers in advance to run the one or more functional layers based, at least in part, on the computed resource requirements of the deterministic transaction. Neural networks are a programming paradigm which enable a computer to learn from observational data. This learning is referred to as deep learning, which is a set of techniques for learning in neural networks. Neural networks, including modular neural networks, are capable of pattern (e.g., state) recognition with speed, accuracy, and efficiency, in situations where data sets are multiple and expansive, including across a distributed network, including but not limited to, cloud computing systems. Modern neural networks are non-linear statistical data modeling tools. They are usually used to model complex relationships between inputs and outputs, or to identify patterns (e.g., states) in data (i.e., neural networks are non-linear statistical data modeling or decision making tools). In general, program code 612 utilizing neural networks can model complex relationships between inputs and outputs and identify patterns in data. Because of the speed and efficiency of neural networks, especially when parsing multiple complex data sets, neural networks and deep learning provide solutions to many problems in multi-source processing, which the program code 612, in embodiments of the present invention, can accomplish when obtaining data and building a model for providing processing such as described herein.

Figure 7:
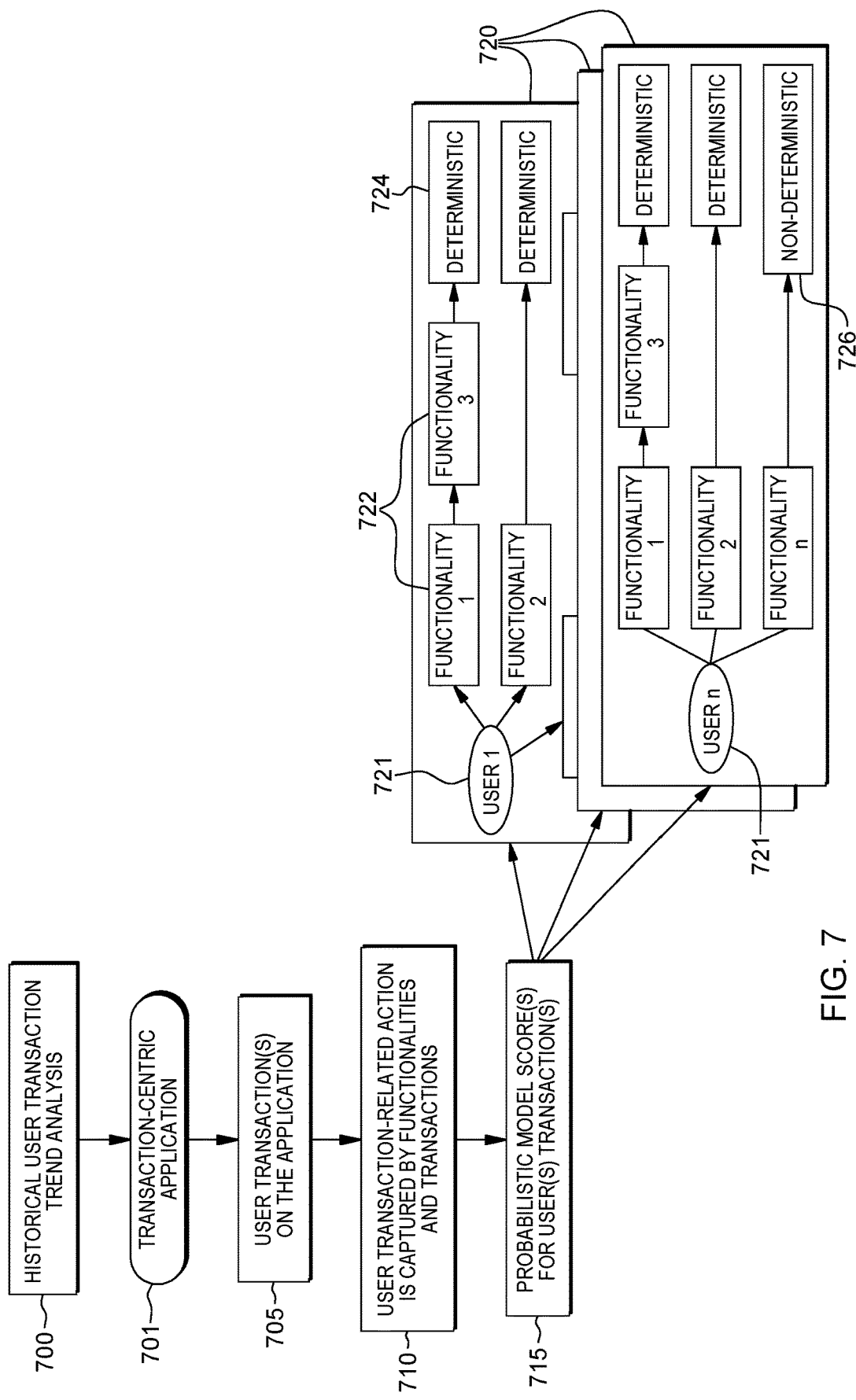
FIG. 7 depicts a further workflow illustrating certain aspects of an embodiment of the present invention.

By way of further example, FIG. 7 depicts an automated, runtime process for launching containers when predictively required, based on data analysis of prior user transaction history, as described herein. As part of the process, a historical user transaction trend analysis 700 is performed. This trend analysis can consider data collected via various channels, such as various web-based applications, mobile-based applications, Internet applications, phone-based applications, etc., where prior transaction data is available to be collected or retrieved. The results of the trend analysis provide a correlation between the current user's recent actions on the same or similar applications, and any need for additional computational resources and/or container invocation. Trend analysis 700 establishes one or more patterns from the application perspective of the current user's history of whether, for instance, the user is likely to successfully complete the particular transaction (e.g., purchase), or be unsuccessful or cancel the transaction. For a particular transaction-centric application 701, and for the particular user transaction on the application 705, user transaction-related data is captured by functionalities and transactions 710 and fed through a probabilistic model 715. The probabilistic model analyzes the prior transaction data and determines, based on the data representative of the user's prior actions, transaction patterns applicable to the current application. In one or more implementations, program code provides or outputs one or more auto-scaling rules required by the application to determine the number of containers to be launched or deployed. Note that these scaling rules are created at runtime, and are not based on the overall system utilization or static configuration files, but rather, are based on the prior transaction history data of the one or more particular users currently engaged with the application. For instance, in FIG. 7, a determination 720 is made for each user 721 whether, for one or more functional layers of the application 722, the user transaction is likely deterministic 724, or non-deterministic 726 as to that layer(s), that is, is likely to need or require that particular application layer(s).

In one or more embodiments, the probabilistic model can pass the auto-scaling rule(s) to the Kubernetes cluster or, for instance, a Docker® swarm, dynamically. Docker is a registered trademark of Docker, Inc., San Francisco, Calif., USA. The probabilistic model continuously analyzes the user transactions and self-corrects itself from any deviations using feedback. For instance, the current transaction upon completion, whether successful or unsuccessful, can be added to the database of prior transaction data for that user. Further, in a trend-based approach, the current transaction upon completion supplants the oldest prior transaction data considered for the particular user. In accordance with the aspects disclosed herein, when a user logs into an application, program code, using the probabilistic model, determines whether the user transaction is deterministic (e.g., likely leading to a successful commit) or non-deterministic (e.g., likely to be unsuccessful in terms of a commit). For a deterministic transaction, one or more container-implemented, functional layers of the application can be launched immediately (e.g., one or more payment gateway interfaces can be launched for a deterministic transaction). For a non-deterministic user transaction, the container-implemented, functional layers may not be launched, while the user's transaction continues to be monitored, and based on the user's further interaction with the application, one or more containers can subsequently be launched as soon as the user transaction becomes deterministic. For instance, based on prior transaction data, and the current transaction reaching application layer 2, then it might be likely based on the prior transaction data that the user transaction will proceed to user application layer 3. In this manner, rather than launching a large number of containers initially, the program code, and probabilistic model, determine whether a user has a history of, for instance, cancelling transactions (and is thus non-deterministic) at some time during the transaction process, and tailor the number of containers per layer accordingly.

For instance, consider a retail application, where a user logs into the retail application (e.g., website) and browses through the store's online catalog and selects items to proceed to checkout. At this point the user is presented with: 1) a form to enter the payment details, 2) the payment gateway interface validates the card details and expiry date, 3) a form to submit the one-time password is presented, 4) the user receives the OTP and submits the form, 5) the OTP is verified, and the payment details are sent to the bank for authorization, and 6) the bank approves the transaction, and the payment gateway interface confirms the transaction to the store and the end user. From a compute perspective, the payment system is a series of application layers, or microservices, with multiple containers to serve each layer or stage of the process. Irrespective of the layer of the transaction the user is in, multiple containers are typically spawned for every layer in anticipation of a successful transaction. During this journey, the user can cancel the transaction at any time before reaching, for instance, step 5), and from a store perspective, the user's buying patterns typically have no bearing on the compute infrastructure, which can be expensive. This issue is addressed herein by launching containers only when likely required, based on data analysis of the user's prior transaction data.

Figure 8:
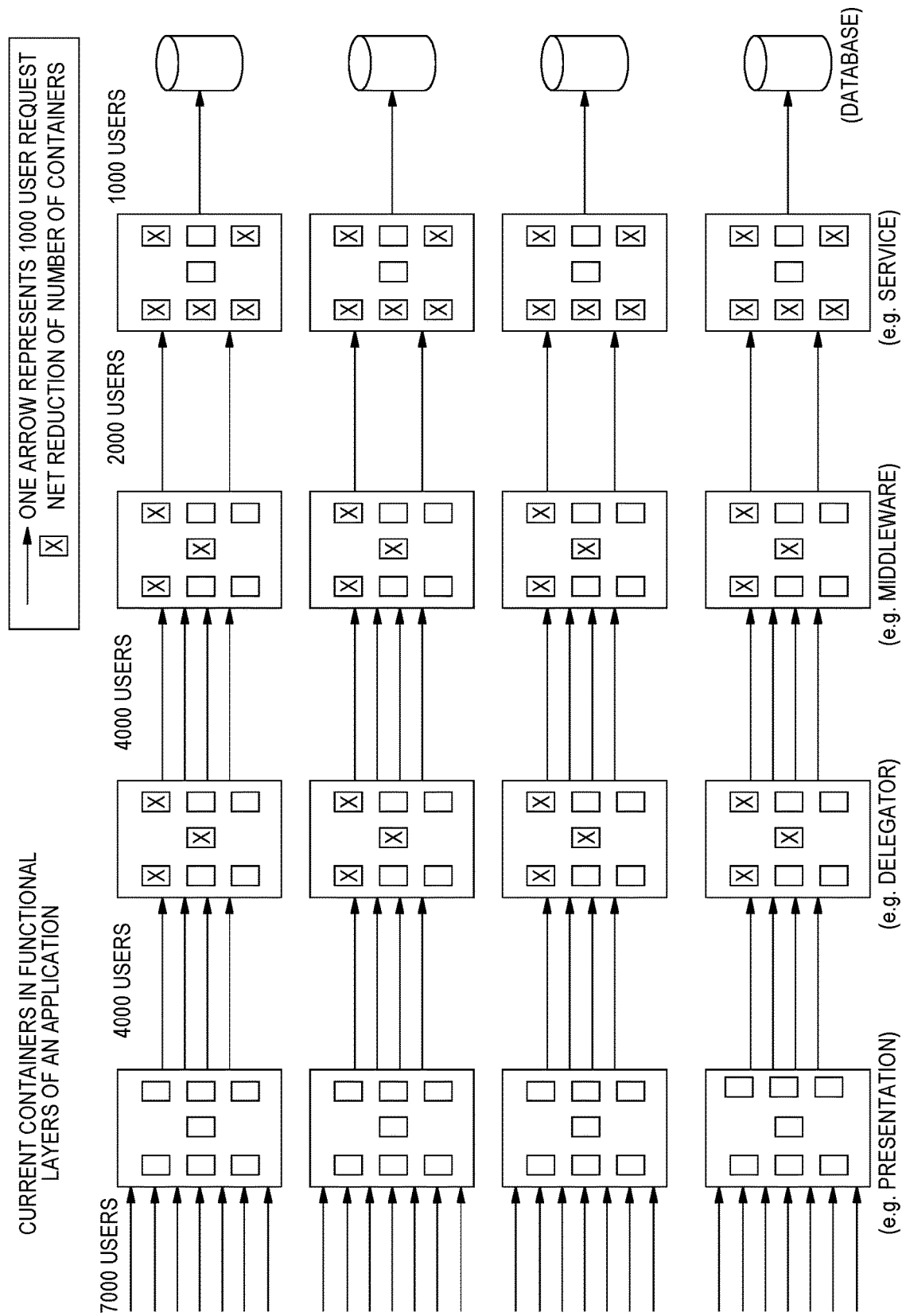
FIG. 8 depicts container deployment using the approach of FIGS. 4-7 in comparison to the existing approach of FIG. 3, and illustrates certain aspects of an embodiment of the present invention.

A further example of this is depicted in FIG. 8, where current containers in functional layers of an application are illustrated using the approach of FIGS. 4-7 in comparison to the approach of FIG. 3. Note the significantly fewer number of containers are required at the higher application layers (e.g., at the delegator, middle-ware, service layers in the example of FIG. 8) using a predictive scaling of containers based on prior user transaction(s) data, as disclosed herein.

In one or more embodiments, an application, such as a client-server, web-based application or a client-server, business-based application, can be broken down into multiple functional layers (e.g., stages, steps, microservices, etc.) that are deployed in a container environment. In one embodiment, each microservice typically implements a unique feature and/or functionality related to the application. In a retail application example, login, browse catalog, checkout, and payment application layers can all be separate microservices. In order to determine the containers required for, for instance, the login microservice (application layer 1), processing can start with a number, such as n concurrent users, with a target utilization percentage of, for instance, 0.70, which results in a certain number (X) of containers for the login application layer. Using trend analysis such as disclosed herein, processing then determines how many of the users typically navigate to application layer 2 successfully (nlayer2). The total number of containers needed for application layer 2 will be a probabilistic equation, such as (nlayer2)/n×X. The trend analysis will further determine how many of the users from application layer 2 typically successfully navigate to application layer 3, and thus, a total number of containers needed for application layer 3 of the application will be a probabilistic equation, such as number of containers=(nlayer2/n)×(nlayer3)/(nlayer2)×X. Similarly, for application layer 4 (e.g., payment service), the formula for the containers required can be number of containers=(nlayer2/n)×(nlayer3/nlayer2)×(nlayer4/nlayer3)×X. Thus, for a layer Y of the application, the number of containers= (nlayer2/n)×(nlayer3/nlayer2)×(nlayer4/nlayer3)× . . . (nlayerY/nlayer(Y−1))×X. Extrapolating the user actions for millions of users, the operational costs of the application infrastructure can be significantly reduced, for instance, cost reductions in the range of 35%-45% are possible.

Figure 9A:
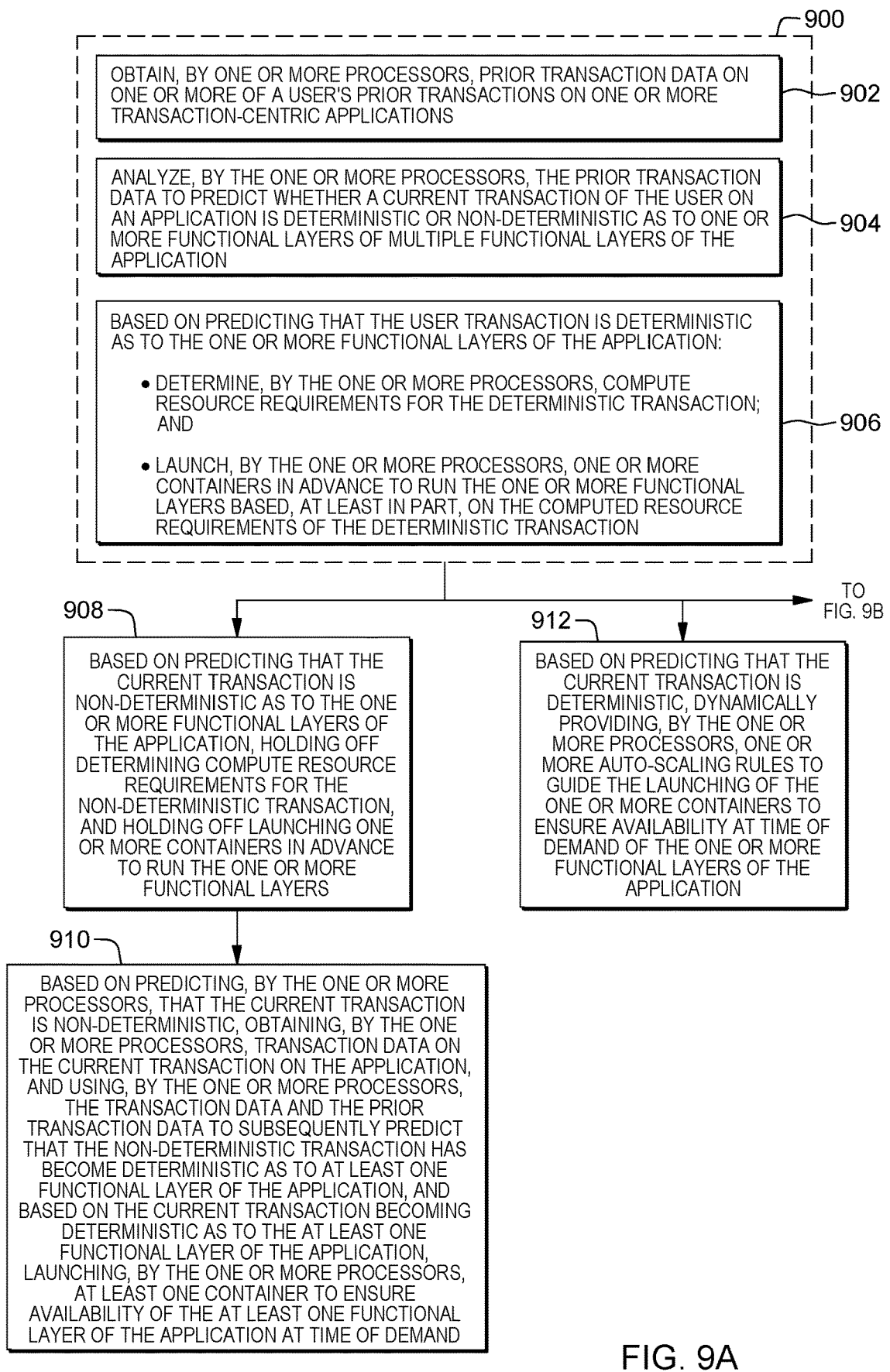
FIGS. 9A & 9B depict a further workflow illustrating certain aspects of an embodiment of the present invention.
Figure 9B:
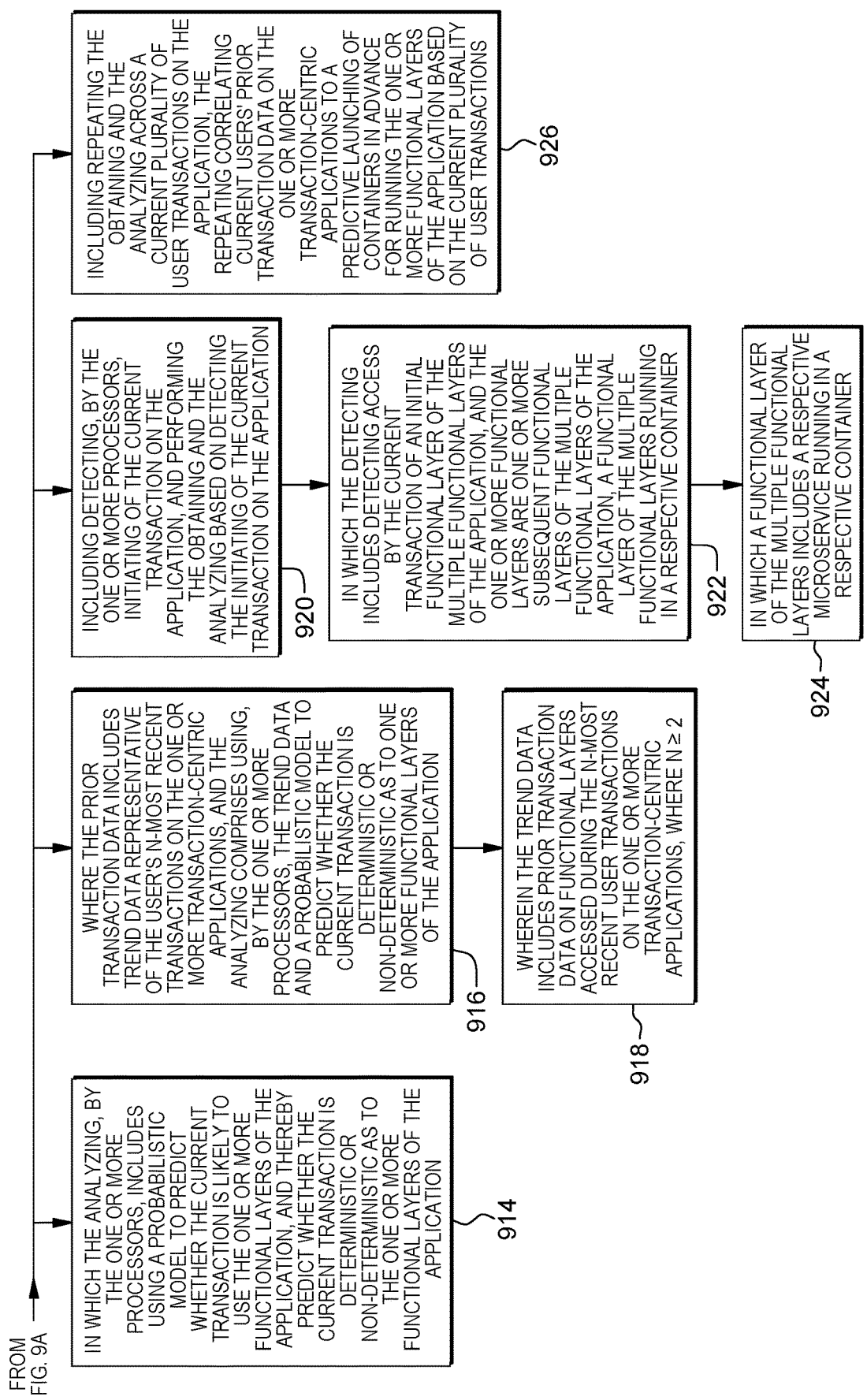

FIGS. 9A-9B depict a further embodiment of program code processing, in accordance with one or more aspects of the present invention.

As illustrated in FIG. 9A, program code implements a process 900 which includes obtaining, by one or more processors, prior transaction data on one or more of a user's prior transactions on one or more transaction-centric applications 902. The one or more processors analyze the prior transaction data to predict whether a current transaction of the user on an application is deterministic or non-deterministic as to one or more functional layers of multiple functional layers of the application 904. Based on predicting that the user transaction is deterministic as to the one or more functional layers of the application, the program code determines compute resource requirements for the deterministic transaction, and launches one or more containers in advance to run the one or more functional layers based, at least in part, on the computer resource requirements of the deterministic transaction 906. As described herein, process 900 is, in one or more embodiments, a runtime process, such as a cloud runtime demand process.

In one or more embodiments, based on the data analysis predicting that the current transaction is non-deterministic as to the one or more functional layers of the application, the program code holds off determining compute resource requirements for the non-deterministic transaction, and holds off currently launching one or more containers in advance to run the one or more functional layers, based on the current user transaction 908. Based on the data analysis predicting that the current transaction is non-deterministic, the program code can obtain transaction data on the current transaction on the application, and use the transaction data and the prior transaction data to subsequently predict via data analysis that the non-deterministic transaction has become deterministic as to at least one functional layer of the application, and based on the current transaction becoming deterministic as to the at least one functional layer of the application, to launch at least one container to ensure availability of the at least one functional layer of the application at time of demand 910.

In one or more embodiments, based on the data analysis predicting that the current transaction is deterministic, the program code provides one or more auto-scaling rules to guide the launching of the one or more containers to ensure availability at time of demand of the one or more functional layers of the application 912.

As illustrated in FIG. 9B, in one embodiment, the data analyzing by the program code can include using a probabilistic model to predict whether the current transaction is likely to use the one or more functional layers of the application, and thereby predict based on data analysis whether the current transaction is deterministic or non-deterministic as to the one or more functional layers of the application 914.

In one or more implementations, where the prior transaction data includes trend data representative of the user's N-most recent transactions on the one or more transaction-centric applications, the analyzing can include using by the program code the trend data and a probabilistic model to predict whether the current transaction is deterministic or non-deterministic as to the one or more functional layers of the application 916. In one embodiment, the trend data includes prior transaction data on functional layers accessed during the N-most recent user transactions on the one or more transaction-centric applications, where N≥2 918.

In one or more embodiments, the program code detects initiating of the current transaction on the application, and performs the data obtaining and the data analyzing based on detecting the initiating of the current transaction on the application 920. In one or more embodiments, the detecting includes detecting access by the current transaction of an initial functional layer of the multiple functional layers of the application, and the one or more functional layers are one or more subsequent functional layers of the multiple functional layers of the application, where each functional layer of the multiple functional layers runs in one or more respective containers 922. In one implementation, a functional layer of the multiple functional layers includes a respective microservice running in a respective container 924.

In one or more embodiments, program code repeats the data obtaining and data analyzing across a plurality of user transactions on the application 926. The repeating correlates current users' prior transaction data on the one or more transaction-centric application to a predictive launching of containers in advance for running the one or more functional layers of the application based on the current plurality of user transactions.

Further exemplary embodiments of a computing environment to implement one or more aspects of the present invention are described below with reference to FIGS. 10-11.

One or more aspects may relate to or use cloud computing.

It is understood in advance that although this disclosure includes a detailed description on cloud computing, implementation of certain teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

A cloud computing node can include a computer system/server, such as the one depicted in FIG. 1. Computer system/server 102 of FIG. 1 can be practiced in distributed cloud computing environments where tasks are performed by remote processing devices that are linked through a communications network. In a distributed cloud computing environment, program modules may be located in both local and remote computer system storage media including memory storage devices. Computer system/server 102 is capable of being implemented and/or performing any of the functionality set forth hereinabove.

Referring now to FIG. 10, illustrative cloud computing environment 50 is depicted. As shown, cloud computing environment 50 can comprise one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Referring to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and predictive scaling of containers processing 96.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A computer-implemented method comprising:
    obtaining, by one or more processors, prior transaction data on one or more of a user's prior transactions on one or more applications;
    analyzing, by the one or more processors, the prior transaction data to predict by a probabilistic model at runtime, based on machine learning using the prior transaction data, whether a current transaction of the user on an application is likely to use one or more functional layers of the application, and thereby predict whether the current transaction is deterministic or non-deterministic as to the one or more functional layers of multiple functional layers of the application; and
    based on predicting that the current transaction is deterministic as to the one or more functional layers of the application:
        determining, by the one or more processors, compute resource requirements for the deterministic transaction; and
        launching, by the one or more processors, one or more containers in advance to run the one or more functional layers based, at least in part, on the compute resource requirements of the deterministic transaction; and
    based on predicting that the current transaction is deterministic, further dynamically providing, by the one or more processors, one or more auto-scaling rules based on the user's prior transaction data to guide the launching of the one or more containers to ensure availability at time of demand of the one or more functional layers of the application.

2. The computer-implemented method of claim 1, further comprising, based on predicting that the current transaction is non-deterministic as to the one or more functional layers of the application, holding off determining compute resource requirements for the non-deterministic transaction, and holding off launching one or more containers in advance to run the one or more functional layers.

3. The computer-implemented method of claim 2, further comprising:
    based on predicting, by the one or more processors, that the current transaction is non-deterministic, obtaining, by the one or more processors, transaction data on the current transaction on the application, and using, by the one or more processors, the transaction data and the prior transaction data to subsequently predict that the non-deterministic transaction has become deterministic as to at least one functional layer of the application, and based on the current transaction becoming deterministic as to the at least one functional layer of the application, launching, by the one or more processors, at least one container to ensure availability of the at least one functional layer of the application at time of demand.

4. The computer-implemented method of claim 1, where the prior transaction data comprises trend data representative of the user's N-most recent transactions on the one or more applications, and the analyzing comprises using, by the one or more processors, the trend data and a probabilistic model to predict whether the current transaction is deterministic or non-deterministic as to one or more functional layers of the application, wherein $N \geq 2$.

5. The computer-implemented method of claim 4, wherein the trend data comprises prior transaction data on functional layers accessed during the N-most recent user transactions on the one or more applications, where $N \geq 2$.

6. The computer-implemented method of claim 1, further comprising detecting, by the one or more processors, initiating of the current transaction on the application, and performing the obtaining and the analyzing based on detecting the initiating of the current transaction on the application.

7. The computer-implemented method of claim 6, wherein the detecting comprises detecting access by the current transaction of an initial functional layer of the multiple functional layers of the application, and wherein the one or more functional layers are one or more subsequent functional layers of the multiple functional layers of the application, each functional layer of the multiple functional layers running in one or more respective containers.

8. The computer-implemented method of claim 7, wherein a functional layer of the multiple functional layers comprises a respective microservice running in a respective container.

9. The computer-implemented method of claim 1, further comprising repeating the obtaining and the analyzing across a current plurality of user transactions on the application, the repeating correlating current users' prior transaction data on the one or more applications to a predictive launching of containers in advance for running the one or more functional layers of the application based on the current plurality of user transactions.

10. A system comprising:
a memory;
one or more processors in communication with the memory; and
program instructions executable by the one or more processors via the memory to perform a method, the method comprising:
  obtaining, by one or more processors, prior transaction data on one or more of a user's prior transactions on one or more applications;
  analyzing, by the one or more processors, the prior transaction data to predict by a probabilistic model at runtime, based on machine learning using the prior transaction data, whether a current transaction of the user on an application is likely to use one or more functional layers of the application, and thereby predict whether the current transaction is deterministic or non-deterministic as to the one or more functional layers of multiple functional layers of the application; and
  based on predicting that the current transaction is deterministic as to the one or more functional layers of the application:
    determining, by the one or more processors, compute resource requirements for the deterministic transaction; and
    launching, by the one or more processors, one or more containers in advance to run the one or more functional layers based, at least in part, on the compute resource requirements of the deterministic transaction; and
  based on predicting that the current transaction is deterministic, further dynamically providing, by the one or more processors, one or more auto-scaling rules based on the user's prior transaction data to guide the launching of the one or more containers to ensure availability at time of demand of the one or more functional layers of the application.

11. The system of claim 10, further comprising, based on predicting that the current transaction is non-deterministic as to the one or more functional layers of the application, holding off determining compute resource requirements for the non-deterministic transaction, and holding off launching one or more containers in advance to run the one or more functional layers.

12. The system of claim 10, where the prior transaction data comprises trend data representative of the user's N-most recent transactions on the one or more applications, and the analyzing comprises using, by the one or more processors, the trend data and a probabilistic model to predict whether the current transaction is deterministic or non-deterministic as to one or more functional layers of the application, wherein $N \geq 2$.

13. The system of claim 12, wherein the trend data comprises prior transaction data on functional layers accessed during the N-most recent user transactions on the one or more applications, where $N \geq 2$.

14. The system of claim 10, further comprising repeating the obtaining and the analyzing across a current plurality of user transactions on the application, the repeating correlating current users' prior transaction data on the one or more applications to a predictive launching of containers in advance for running the one or more functional layers of the application based on the current plurality of user transactions.

15. A computer program product comprising:
a computer readable storage medium having program instructions embodied therewith, the program instructions being executable by one or more processors to cause the one or more processors to:
  obtain, by the one or more processors, prior transaction data on one or more of a user's prior transactions on one or more transaction-centric applications;
  analyze, by the one or more processors, the prior transaction data to predict by a probabilistic model at runtime, based on machine learning using the prior transaction data, whether a current transaction of the user on an application is likely to use one or more functional layers of the application, and thereby predict whether the current transaction is deterministic or non-deterministic as to the one or more functional layers of multiple functional layers of the application; and
  based on predicting that the current transaction is deterministic as to the one or more functional layers of the application:
    determine, by the one or more processors, compute resource requirements for the deterministic transaction; and
    launch, by the one or more processors, one or more containers in advance to run the one or more functional layers based, at least in part, on the compute resource requirements of the deterministic transaction; and
  based on predicting that the current transaction is deterministic, further dynamically providing, by the one or more processors, one or more auto-scaling rules based on the user's prior transaction data to guide the launching of the one or more containers to ensure availability at time of demand of the one or more functional layers of the application.

16. The computer program product of claim 15, wherein the program instructions are further executable by the one or more processors to cause the one or more processors to hold off, based on predicting that the current transaction is non-deterministic as to the one or more functional layers of the application, determining compute resource requirements for the non-deterministic transaction, and to hold of launching of the one or more containers in advance to run the one or more functional layers.

\* \* \* \* \*